J. C. CHARBONEAU.
FLOATING THRESHING MACHINE.
APPLICATION FILED APR. 8, 1918.

1,293,706.

Patented Feb. 11, 1919.
4 SHEETS—SHEET 3.

Witnesses
E. C. Wells
A. H. Opsahl

Inventor
Joseph C. Charboneau
By his Attorneys
Williamson & Merchant

J. C. CHARBONEAU.
FLOATING THRESHING MACHINE.
APPLICATION FILED APR. 8, 1918.
1,293,706.
Patented Feb. 11, 1919.
4 SHEETS—SHEET 4.
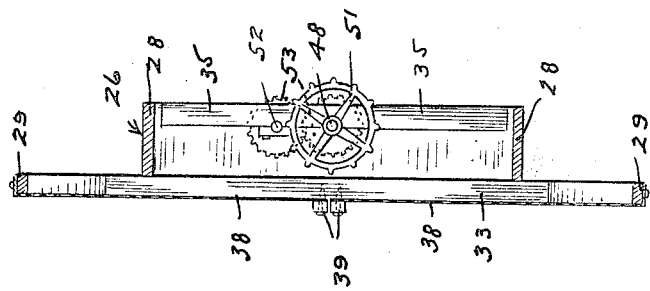
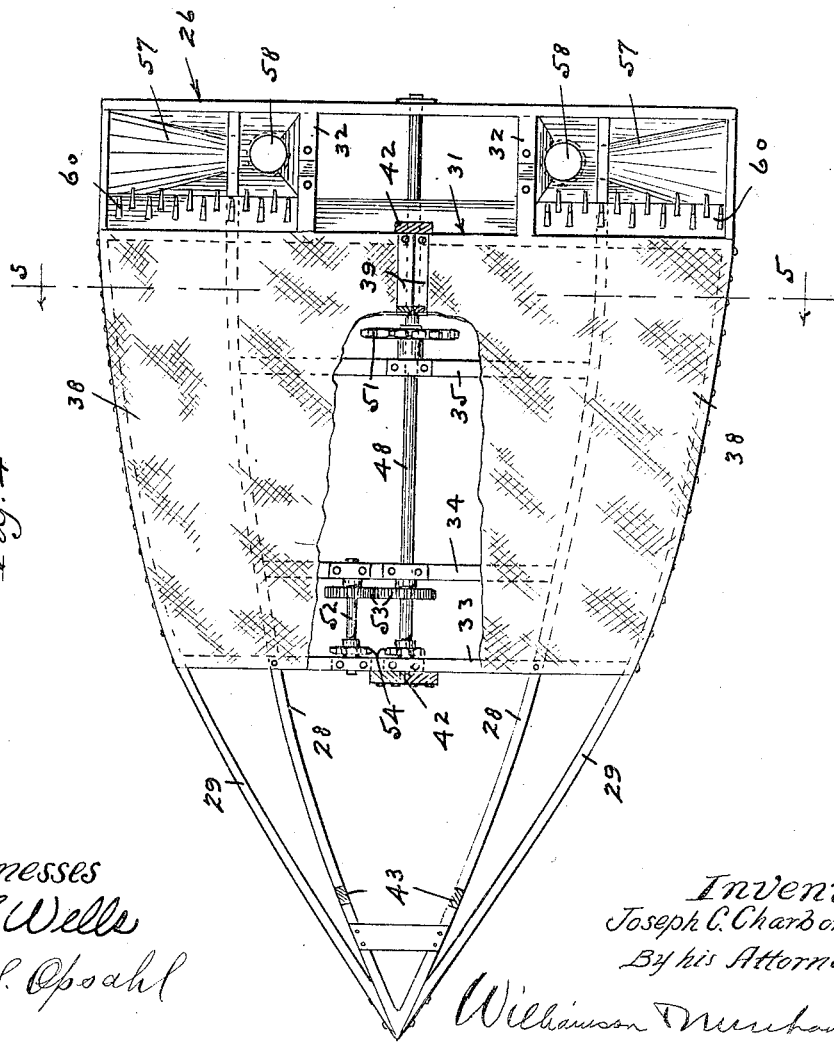

UNITED STATES PATENT OFFICE.

JOSEPH C. CHARBONEAU, OF BEMIDJI, MINNESOTA.

FLOATING THRESHING-MACHINE.

1,293,706.  Specification of Letters Patent.  Patented Feb. 11, 1919.

Application filed April 8, 1918.  Serial No. 227,219.

*To all whom it may concern:*

Be it known that I, JOSEPH C. CHARBONEAU, a citizen of the United States, residing at Bemidji, in the county of Beltrami and State of Minnesota, have invented certain new and useful Improvements in Floating Threshing-Machines; and I do hereby declare the following to be a full, clear, and exact description of the invention, such as will enable others skilled in the art to which it appertains to make and use the same.

My invention has for its object to provide a floating threshing machine especially adapted for use in harvesting wild rice; and to this end, generally stated, it consists of the novel devices and combinations of devices hereinafter described and defined in the claims. As is well known, great fields of wild rice are going to waste each year on account of inadequate means for harvesting the same. The food value of wild rice has long been known to the Indians, but only during the past few years has a demand been created for the same on the market as a staple food. On account of the difficulty in harvesting wild rice the supply has been very limited and the price high. Most of the wild rice has been harvested by hand by the Indians, although attempts have been made to cut the wild rice by means of floating reapers. This latter method is laborious and slow, as it necessitates the gathering of the floating straw which must be carried to shore, dried, and thereafter threshed. By the use of my floating threshing machine the wild rice is threshed directly from the standing straw and collected into bags.

In the accompanying drawings, which illustrate the invention, like characters indicate like parts throughout the several views.

Referring to the drawings:

Fig. 4 is a plan view of the frame and attached parts of the threshing mechanism removed from the boat, with some parts broken away and with some parts sectioned, on an enlarged scale; and Fig. 5 is a transverse section taken on the line 5—5 of Fig. 4.

Figure 1:
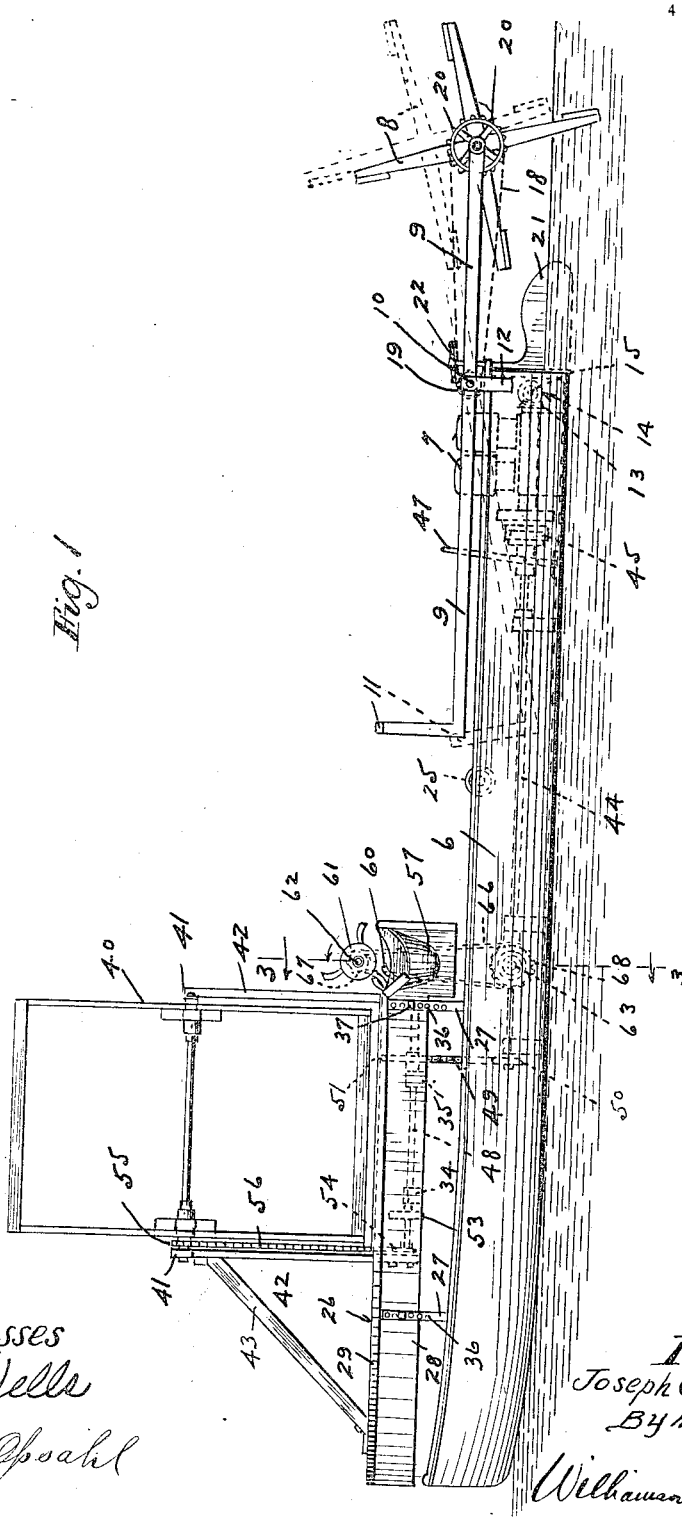
Figure 1 is a side elevation of the floating threshing machine, with some parts shown in different positions by means of broken lines.
Figure 2:
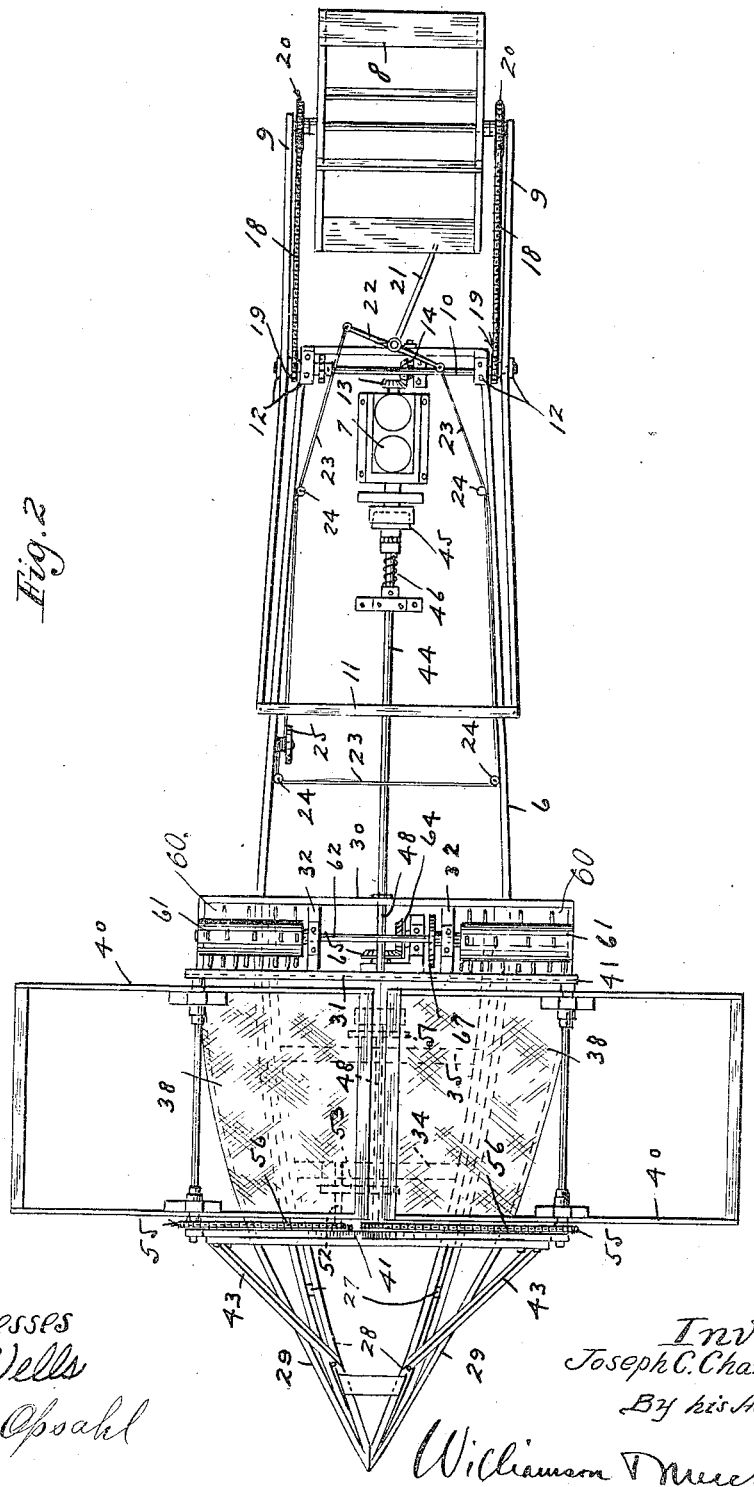
Fig. 2 is a plan view of the same.

The numeral 6 indicates the hull of a motor boat, having a relatively flat bottom, on which is mounted, in the stern of the boat, an internal combustion engine, indicated, as an entirety, by the numerals 7. For propelling the boat under the power of the engine 7, I provide a stern paddle wheel 8, journaled on the rear ends of a pair of long levers 9. These levers 9 are intermediately fulcrumed on a shaft 10, and the forward ends thereof, which are turned upward, are connected by a cross bar 11. The shaft 10 extends transversely of the boat hull 6, and is journaled in bearing brackets 12, secured to the sides of said hull.

For driving the paddle wheel 8 from the crank shaft of the engine 7, the following connections are provided, to-wit: Secured to the rear end of the engine crank shaft is a bevel gear 13, which meshes with a bevel gear 14, on a transverse shaft 15, directly underlying the shaft 10 and journaled in the bearing brackets 12. The shaft 10 is driven from the shaft 15 by a sprocket chain 16, which runs over alined sprocket wheels 17 on said two shafts. The paddle wheel 8 is driven from the shaft 10 by a pair of sprocket chains 18, which run over alined sprocket wheels 19 and 20, on the shaft 10 and shaft for the paddle wheel 8, respectively.

To steer the floating threshing machine I provide a rudder 21, to which is secured a cross arm 22. Ropes 23 attached to the cross arm 22, extend over guide sheaves 24, secured to the sides of the boat hull 6, and reversely wound on a wheel-equipped drum 25. The wheel-equipped drum 25 is located slightly forward of the cross bar 11 so that an operator may easily manipulate said drum to steer the boat, and at the same time raise or lower the cross bar 11 to vary the depth the paddle wheel 8 enters the water or to lift the same entirely out of the water. If desired, suitable means may be provided for holding the levers 9 with the paddle wheel 8 in different elevations.

Located over the front end portion of the boat hull 6 is a skeleton frame 26, removably supported on a pair of supplemental ribs 27, the ends of which are extended considerably above said hull. The frame 26 includes a pair of relatively wide side members 28, set vertically edgewise, connected at their front ends, directly above the prow of the boat, and bent to conform to the sides thereof. To the front end of the side members 28 is secured the front ends of a pair of gathering rails 29, which also constitute a part of the frame 26, that are curved along the same lines as the side members 28, but are spaced apart therefrom so as to extend for a considerable distance outward of the sides of the boat hull 6. The extreme rear ends of the side members 28 and rails 29 are rigidly connected and held properly spaced by a cross tie-bar 30, and forward thereof, a comparatively short distance, said side members and rails are again connected by a cross tie-bar 31. These cross tie-bars 30 and 31 are in turn rigidly connected at points between side members 28 by short bars 32. Forward of the longitudinal center of the frame 26 the side members 28 and gathering rails 29 are again connected by a third cross tie-bar 33. Between the cross tie-bars 31 and 33 the side members 28 are further rigidly connected by front and rear cross tie-bars 34 and 35, respectively.

The end portions of the supplemental ribs 27 are provided with a multiplicity of bores 36, through which nut-equipped bolts 37, secured in the side members 28, may be passed. Obviously, by inserting the bolts 37 in the different bores 36 the elevation of the frame 26 may be changed, at will, for a purpose that will presently appear.

Extending from one gathering rail 29 to the other, and between the cross tie-bars 31 and 33, are two deck sections 38, of convas or other suitable material. The outer edges of the deck sections 38 are tacked or otherwise secured to the gathering rails 29, cross tie-bars 31 and 33, and rest upon the side members 28 and cross tie-bars 34 and 35. The adjacent edges of the deck sections 38 meet at the longitudinal center of the frame 26 and are secured to slats 39, which in turn, are secured, at their ends, to the cross tie-bars 31 and 33.

On each side of the boat hull 6 is a gathering reel 40, journaled on the outer ends of cross arms 41, secured to a pair of longitudinally spaced uprights 42, at the transverse center of the boat. The lower ends of the uprights 42 are rigidly secured to the cross tie-bars 31 and 33, and the foremost of said uprights is further supported by a pair of oblique braces 43, anchored to the side members 28 of the frame 26. The journals for the reels 40 extend parallel to the longitudinal center of the boat and are located substantially over the gathering rails 29. The length of the arms of the gathering reels 40 is such that the blades thereof pass just above the gathering rails 29, at the rear ends thereof, thus leaving converging openings between said blades and gathering rails.

Figure 3:
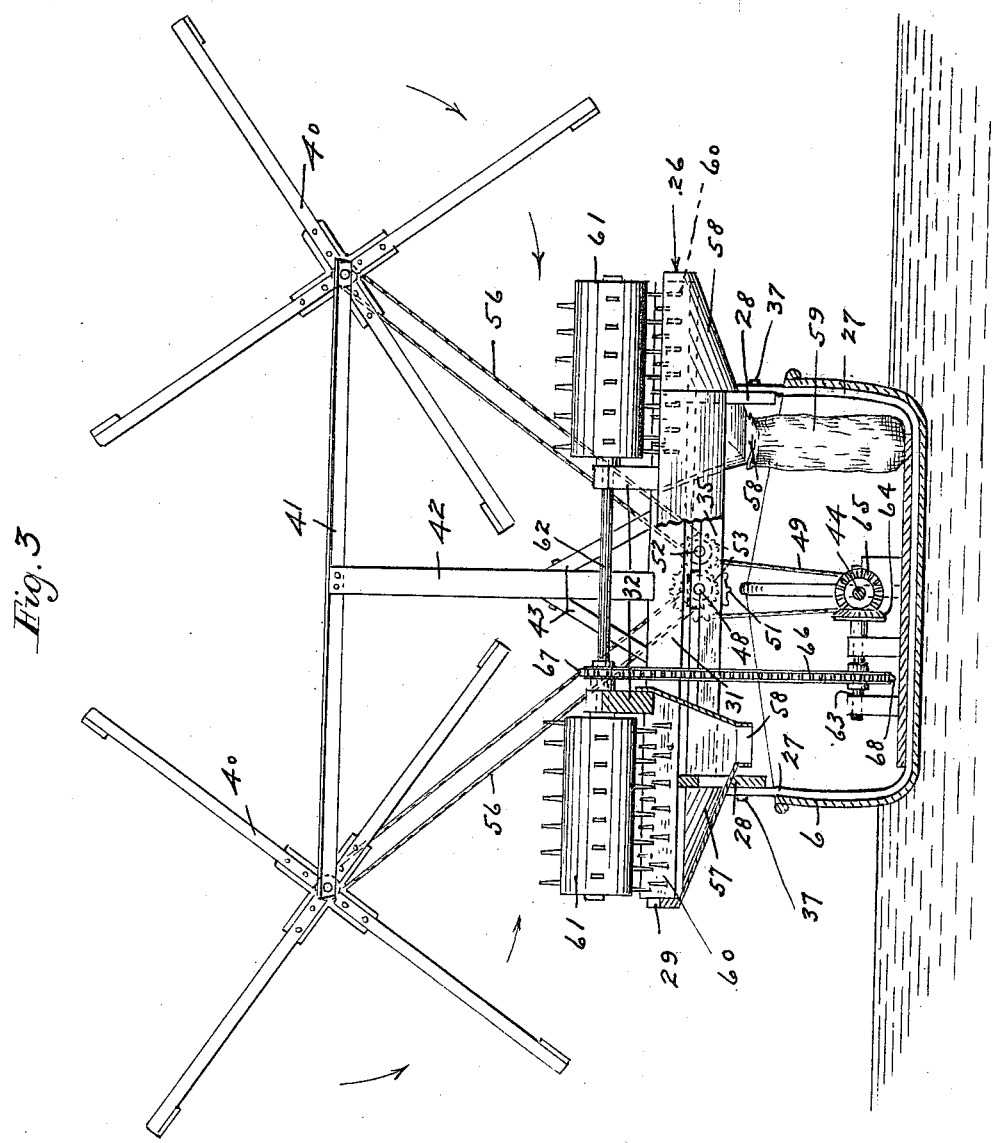
Fig. 3 is a transverse section, taken on the line 3—3 of Fig. 1, on an enlarged scale.

The following connections are provided for driving the gathering reels 40, in the direction of the arrows marked on Fig. 3, to-wit: A longitudinal shaft 44, axially alined with the engine crank shaft, is journaled in bearings on the bottom of the boat and rotatably connected to said crank shaft by a friction cone clutch 45. The movable member of this clutch 45 is yieldingly held in engagement with the fixed member thereof by a coil spring 46. A shipper lever 47 is provided for moving the movable clutch member out of engagement with the fixed member thereof.

Journaled in bearings on the cross tie-bars 30, 33, 34 and 35, is a countershaft 48, that is driven by a sprocket chain 49, which runs over a sprocket wheel 50, on the front end of the shaft 44 and a sprocket wheel 51 on the rear end of the shaft 48. Extending parallel to the shaft 48 is a short shaft 52, journaled in bearings on the cross tie-bars 33 and 34, and driven from said shaft 48 by intermeshing gears 53. On the forward ends of the shafts 48 and 52 are sprocket wheels 54, alined with sprocket wheels 55, on the forward ends of the journals for the gathering reels 40. Sprocket chains 56 run over alined pairs of the sprocket wheels 54 and 55, and independently drive said gathering reels in the direction of the arrows marked on Fig. 3.

In the two openings formed in the frame 26, rearward of the deck sections 38, between the gathering rails 29, bars 32 and cross tie-bars 30 and 31, are mounted hoppers 57. These hoppers 57 are below the deck sections 38 and have depending short spouts 58, so arranged as to come within the boat hull and adapted to discharge in bags 59, provided to receive the wild rice. Also mounted in each of these openings, above the respective hopper 57, is a tooth-equipped concave 60, which projects parallel to the direction of the rotation of the gathering reels 40. Coöperating with each concave 60 is a tooth-equipped cylinder 61, and these cylinders are secured on the outer ends of the transverse shaft 62, journaled in bearings on the bars 32. The cylinders 61 are simultaneously driven from the shaft 62 by a short shaft 63, having a bevel gear 64, which meshes with a bevel gear 65, on the shaft 44. A sprocket chain 66 runs over a sprocket wheel 67, on the shaft 62, and a sprocket wheel 68 on the shaft 63.

Under the forward movement of the boat through the wild rice, the gathering rails 29 part the same gradually and press the wild rice outward into two rows. These rows of wild rice are engaged by the reels 40 and the tops thereof bent over the said gathering rails, onto the deck section 38, and thus guided between the coöperating cylinders 61 and concaves 60. The wild rice, removed from the straw by the cylinders and concaves, falls into the hopper 57, and thereby conveyed into the bags 59. Thus threshing the wild rice while standing and immediately sacking the same, makes the harvesting thereof comparatively simple. Any of the wild rice threshed by the reels will fall directly on the deck sections 38 from where it can be moved from time to time. By manipulating the lever 47 the clutch 45 may be operated to start or stop the reels and threshing cylinders at will. Obviously, by raising or lowering the hand bar 11 the elevation of the paddle wheels may be varied at will, thus controlling, to a considerable extent, the speed of the boat. By using a comparatively flat bottomed boat and a paddle wheel, the improved floating threshing machine may be easily propelled in shallow lakes and through the wild rice fields.

What I claim is:

1. A floating threshing machine having threshing mechanism, and means for directing the tops of the standing straw into the threshing mechanism from one side of the machine.

2. A floating threshing machine having threshing mechanism, means for gathering the standing straw into a row at one side of the machine, and means for directing the tops of the standing straw in the row into the threshing mechanism.

3. A floating threshing machine having duplex threshing mechanism, means for gathering the standing straw into two rows, and means for directing the tops of the standing straw in the two rows into the threshing mechanism at opposite ends thereof.

4. In a floating threshing machine, the combination with a boat, of a coöperating cylinder and concave, a gathering reel, and means for operating the gathering reel to direct the tops of the straw between the cylinder and concave at one end thereof and substantially parallel to the axis of the cylinder.

5. In a floating threshing machine, the combination with a boat having a deck, of a coöperating cylinder and concave, a gathering reel, and means for operating the reel to carry the tops of the straw over the deck and direct the same between the cylinder and concave at one end thereof and substantially parallel to the axis of the cylinder.

6. In a floating threshing machine, the combination with a boat having a deck, of a coöperating cylinder and concave rearward of the deck, and a reel working over the deck and rotating transversely of the direction of the travel of the boat for directing the heads of the standing straw between the cylinder and concave at one end thereof and substantially parallel to the axis of the cylinder.

7. In a floating threshing machine, the combination with a boat having a deck, of a coöperating cylinder and concave rearward of the deck, a reel working over the deck and rotating transversely of the direction of the rotation of the cylinder for directing the heads of the standing straw between the cylinder and concave at one end thereof and a hopper under the concave.

8. In a floating threshing machine, the combination with a boat, of a frame removably supported on the boat and having a deck, a coöperating cylinder and concave mounted on the frame rearward of the deck, and a reel journaled on the frame, working over the deck and rotating transversely of the direction of rotation of the cylinder for directing the heads of the standing straw between the cylinder and concave at one end thereof and substantially parallel to the axis of the cylinder.

9. In a floating threshing machine, the combination with a boat, of a frame removably supported on the boat and having a deck, a coöperating cylinder and concave mounted on the frame rearward of the deck, a reel journaled on the frame, working over the deck and rotating transversely of the direction of the rotation of the cylinder for directing the heads of the standing straw between the cylinder and concave, and a gathering rail extending from the prow of the boat to the cylinder and concave and over which traveling rails the straw is bent by the reel.

10. In a floating threshing machine, the combination with a boat, of a vertically adjustable frame removably supported on the boat and having a deck, a coöperating cylinder and concave mounted on the frame rearward of the deck, and a reel journaled on the frame, working over the deck and rotating transversely of the direction of rotation of the cylinder, for directing the heads of the standing straw between the cylinder and concave substantially parallel to the axis of the cylinder.

11. In a floating threshing machine, the combination with a boat having a deck, of a pair of coöperating cylinders and concaves, and a pair of reels working over the deck transversely of the direction of the rotation of the cylinders for directing the heads of the standing straw between the coöperating cylinders and concaves substantially parallel to the axis of the cylinders.

12. In a floating threshing machine, the combination with a boat having a pair of rearwardly diverging gathering rails extending from the prow of the boat, a deck between the gathering rails, a pair of coöperating cylinders and concaves at the rear of the deck, and a pair of reels working over the deck for directing the heads of the standing straw transversely over the gathering rails and between the coöperating cylinders and concaves substantially parallel to the concaves of the cylinders.

13. In a floating threshing machine, the combination with a motor propelled boat, having a pair of rearwardly diverging gathering rails extending from the prow of the boat, a deck between the gathering rails, a pair of coöperating cylinders and concaves at the rear of the deck, a pair of reels working over the deck for directing the heads of the standing straw transversely over the gathering rails and between the coöperating cylinders and concaves substantially parallel to the axis of the cylinders and driving connections from the motor of the boat to the cylinders and reels.

In testimony whereof I affix my signature in presence of two witnesses.

JOSEPH C. CHARBONEAU.

Witnesses:
R. H. SCHUMAKER,
H. R. HENDERSON.

Copies of this patent may be obtained for five cents each, by addressing the "Commissioner of Patents, Washington, D. C."